C. C. Reinhardt,
Truss.
N° 15,858.    Patented Oct. 7, 1856.
Fig: 1
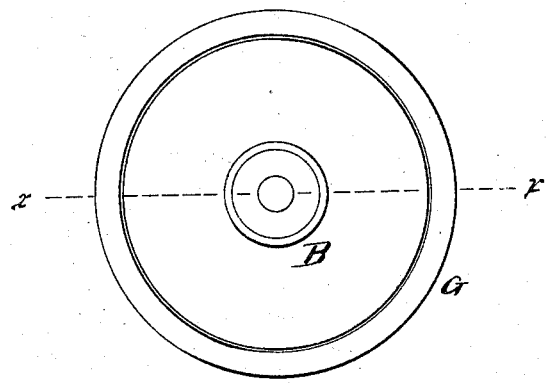
Fig: 2
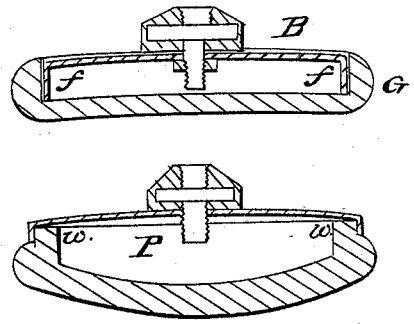

UNITED STATES PATENT OFFICE.

CHARLES C. REINHARDT, OF BALTIMORE, MARYLAND.

GLASS OR EARTHEN TRUSS-PAD.

Specification of Letters Patent No. 15,858, dated October 7, 1856.

*To all whom it may concern:*

Be it known that I, C. C. REINHARDT, of the city of Baltimore and State of Maryland, have invented a new and useful Improvement in Truss-Pads; and I do hereby declare that the following is a full, clear, and exact description of the construction and operation of the same, reference being had to the annexed drawing, forming part of this specification, in which—

Figure 1 is a back view of pad, Fig. 2 is a section on $x\ x$.

Similar letters of reference denote the same part.

The invention refers to the manner of attaching glass pads to their metallic backs, and is designed to obviate defects existing in the ordinary mode of securing the glass within a shallow brass cup.

It consists in constructing the back with a flange extending around its edge, so as to slip within the rim constituting the edge of the glass pad; whereby the back is secured to the glass as, and with advantages hereinafter to be set forth.

In the drawing G represents the glass, and B the metallic portion of the pad. The former cast hollow and so that its edge shall constitute a rim for the reception of the flange $f$ of the metallic piece B, as shown in Fig. 2.

The ordinary mode of attaching the glass to the back is shown at P, where a rim $w$ of the glass is held in a shallow metallic cup. This rim $w$ was of necessity made shallow, as the increasing of its depth would bring the metal too near the face of the pad, or if increased in direction of the back, it would add too much to the thickness and weight of the pad. The ill effect of this shallow rim, is the splintering of the rim and consequent loosening of the back by pressure.

This I obviate by placing the flange $f$ within the deep and strong rim constituting the edge of the pad. Moreover, with the cup attachment, the sinking of the pad in the flesh of the wearer brings the metal in contact with the skin, producing irritation and sores. With the mode of attachment here claimed it is impossible for the skin of the wearer to come in contact with the metal.

I claim—

The attachment of metallic backs to the glass faces of truss pads by a flange around the edge of the back slipping within the rim constituting the edge of the glass face piece, substantially as, and for the purposes specified.

In testimony whereof, I have hereunto signed my name before two subscribing witnesses.

CHARLES C. REINHARDT.

Witnesses:
M. SIMON,
GEO. P. GOLD.